United States Patent
Déjean (10) Patent No.: US 9,672,195 B2
(45) Date of Patent: *Jun. 6, 2017

(54) METHOD AND SYSTEM FOR PAGE CONSTRUCT DETECTION BASED ON SEQUENTIAL REGULARITIES

(71) Applicant: Xerox Corporation, Norwalk, CT (US)

(72) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 679 days.

This patent is subject to a terminal disclaimer.

(21) Appl. No.: 14/140,075

(22) Filed: Dec. 24, 2013

(65) Prior Publication Data

US 2015/0178256 A1    Jun. 25, 2015

(51) Int. Cl.
*G06F 17/21* (2006.01)
*G06F 17/22* (2006.01)

(52) U.S. Cl.
CPC .................................. *G06F 17/217* (2013.01)

(58) Field of Classification Search
CPC . G06F 17/3089; G06F 17/217; G06F 17/2288
See application file for complete search history.

(56) References Cited

U.S. PATENT DOCUMENTS

| | | | |
|---|---|---|---|
| 7,165,216 B2 | 1/2007 | Chidlovskii | |
| 7,428,700 B2 * | 9/2008 | Wen | ........ G06F 17/218 715/234 |
| 7,693,848 B2 | 4/2010 | Déjean et al. | |
| 7,937,653 B2 | 5/2011 | Déjean et al. | |
| 2002/0107735 A1* | 8/2002 | Henkin | ........ G06F 17/30899 705/14.55 |
| 2003/0078899 A1* | 4/2003 | Shanahan | ........ G06F 17/30707 707/E17.09 |
| 2005/0177586 A1* | 8/2005 | Chen | ........ G06F 17/30905 707/E17.121 |
| 2006/0155703 A1 | 7/2006 | Déjean et al. | |
| 2012/0079370 A1 | 3/2012 | Déjean | |
| 2013/0321867 A1 | 12/2013 | Dejean | |

OTHER PUBLICATIONS

Lin, Xiaofan, "Header and Footer Extraction by Page-Association", HP Laboratories Palo Alto, May 6, 2002, 9 Pages.
U.S. Appl. No. 13/484,708, filed Jun. 6, 2013, Hervé Déjean.
U.S. Appl. No. 13/911,452, filed Jun. 6, 2013, Hervé Déjean.
U.S. Appl. No. 13/943,263, filed Jun. 16, 2013, Hervé Déjean.

* cited by examiner

*Primary Examiner* — Ariel Mercado
(74) *Attorney, Agent, or Firm* — Fay Sharpe LLP (57) ABSTRACT

Disclosed is a method and system that generates a page construct structure associated with a sequentially-ordered set of pages, each being characterized by a set of page construct features. N-grams, i.e., a sequence of n features, are computed from a set of page construct features for n contiguous pages, and n-grams which are repetitive are selected. Pages matching the most frequent repetitive n-ram are grouped together under a new node, and a new sequence is created. The method is iteratively applied to this new sequence. The output is an ordered set of trees.

14 Claims, 8 Drawing Sheets

FIG. 11

METHOD AND SYSTEM FOR PAGE CONSTRUCT DETECTION BASED ON SEQUENTIAL REGULARITIES

CROSS REFERENCE TO RELATED PATENTS AND APPLICATIONS

U.S. patent application Ser. No. 13/943,263 by Hervé Déjean, filed Jul. 16, 2013, entitled "PAGE FRAME AND PAGE COORDINATE DETERMINATION METHOD AND SYSTEM BASED ON SEQUENTIAL REGULARITIES" and U.S. patent application Ser. No. 13/911,452, by Hervé Déjean, filed Jun. 6, 2013, entitled "METHODS AND SYSTEMS FOR GENERATION OF DOCUMENT STRUCTURES BASED ON SEQUENTIAL CONSTRAINS", U.S. Patent Application Publication No. 2006/0155703, by Hervé Déjean et al., published Jul. 13, 2006, entitled "METHOD AND APPARATUS FOR DETECTING A TABLE OF CONTENTS AND REFERENCE DETERMINATION"; U.S. Pat. No. 7,693,848, by Hervé Déjean et al., issued Apr. 6, 2010, entitled "METHOD AND APPARATUS FOR STRUCTURING DOCUMENTS BASED ON THEIR LAYOUT, CONTENT AND COLLECTION"; and U.S. Pat. No. 7,165,216, by Boris Chidlovskii, issued Jan. 16, 2007, entitled, "SYSTEMS AND METHODS FOR CONVERTING LEGACY AND PROPRIETARY DOCUMENTS INTO EXTENDED MARK-UP LANGUAGE FORMAT"; U.S. Pat. No. 7,937,653, by Déjean et al., issued May 3, 2011, entitled "METHOD AND APPARATUS FOR DETECTING PAGINATION CONSTRUCTS INCLUDING A HEADER AND A FOOTER IN LEGACY DOCUMENTS"; and U.S. Patent Application Publication No. 2013/0321867, by Hervé Déjean, published May 5, 2013, entitled "TYPOGRAPHICAL BLOCK GENERATION", are herein incorporated by reference in their entirety.

BACKGROUND

The following relates to the information storage and processing arts. It finds application in conjunction with electronic document format conversion and in particular with cataloging of legacy documents in a marked-up format such as extensible markup language (XML), standard generalized markup language (SGML), hypertext markup language (HTML), or the like, and will be described with particular reference thereto. However, it is to be appreciated that the following is amenable to other like applications.

Legacy document conversion relates to converting unstructured documents existing in formats such as ADOBE® portable document format (PDF), various text formats, various word processing formats, and the like into structured documents employing a markup language such as XML, SGML, HTML, and the like. In structured documents, content is organized into delineated sections such as document pages with suitable headers/footers and so forth. Alternatively, a textual header of a table spanning out multiple pages comprises a pagination construct when this header repeats itself on those pages. Such organization typically is implemented using markup tags. In some structured document formats such as XML, a document type definition (DTD) or similar document portion provides overall information about the document, such as an identification of the sections, and facilitates complex document structures such as nested sections.

There is thus interest in converting unstructured documents to a structured format when such structure can facilitate storage and access of this document as a "legacy document". The particular motivations for converting documents are diverse, typically including intent to reuse or repurpose parts of the documents, desire for document uniformity across a database of information store, facilitating document searches, and so forth. Technical manuals, user manuals and other proprietary reference documents are common candidates for such legacy conversions.

A particular problematic issue that arises during the conversion process is the rebuilding or preserving of structural information. The output structure can be very different from the input structure. For example, page segmentation is often discarded in a logical representation, where logical units are elements such as chapters and sections. Pages are usually considered as a physical element and do not appear. Content elements related to this page segmentation, typically headers and footers, and present in the input document then need to be processed cautiously. In prior art converters, such as PDF2[XML/HTML], headers and footers are not differentiated from the body elements and can disrupt the flow of the main text. This not only generates an incorrect logical document, but can also introduce noise for further processing, such as natural language processing. Accordingly, existing methods and systems for identifying and extracting pagination constructs in the conversion of structured legacy documents is neither efficient nor robust. Of particular note is Xiaofan Lin, "HEADER AND FOOTER EXTRACTION BY PAGE-ASSOCIATION", HP® Laboratories Palo Alto, May 6, 2002, 9 Pages. This reference relies upon comparison with neighboring pages for identifying a particular relationship indicative of commonly configured headers/footers. Such neighboring page comparison techniques can fail when the header/footer occurs very few times in the document.

For purposes of this application, "header" is intended to comprise matte, i.e., textual content, that is printed at the top of every page of the document, typically positioned in the top margin of the page. For example, a title, page number, file name, revision dates, the author's name, or any other information about the document that is repeated throughout the document or a portion of the document is considered header matter. Likewise, a "footer" includes similar information content positioned in the bottom margin of the page. As used in the subject application, "header/footer" should be construed to include either a header or footer individually or in combination.

This disclosure provides methods and systems to provide a light and robust method and system for detecting page constructs, such as headers and footers of a document.

BRIEF DESCRIPTION

In one embodiment of this disclosure, described is a computer implemented method of generating a page construct sequential hierarchical structure associated with a sequence of pages associated with a digital version of a document comprising: a) obtaining a sequence of pages representing the document; b) defining a set of page construct features associated with each page of the sequence of pages, each page construct feature defined as a document element which recurrently occurs at regular positions outside a running content of the sequence of pages, the construct feature defined by a feature value types; c) computing a set of feature values associated with the set of page construct features for each page of the sequence; d) generating a set of n-grams from the sequence of pages, an n-gram including an ordered sequence of n page construct features provided by a sequence of n pages; e) electing sequential n-grams from the set of n-grams, the sequential n-grams defined as similar contiguous n-grams; f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page construct hierarchical sequential structure associated with the document.

In another embodiment of this disclosure, described is an image processing system comprising: a controller configured to receive a digital version of a document, the controller configured to execute instructions to perform a method of generating a page construct hierarchical sequential structure associated with a digital version of the document comprising: a) obtaining a sequence of pages representing the document; b) defining a set of page construct features associated with each page of the sequence of pages, each page construct feature defined as a document element which recurrently occurs at regular positions outside a running content of the sequence of pages, the construct feature defined by a feature value types; c) computing a set of feature values associated with the set of page construct features for each page of the sequence; d) generating a set of n-grams from the sequence of pages, an n-gram including an ordered sequence of n page construct features provided by a sequence of n pages; e) electing sequential n-grams from the set of n-grams, the sequential n-grams defined as similar contiguous n-grams; f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page construct hierarchical sequential structure associated with the document.

In still another embodiment of this disclosure, described is a computer program product comprising a non-transitory recording medium storing instructions, which when executed on a computer cause the computer to perform a method of generating a page construct hierarchical sequential structure associated with a digital version of a document comprising: a) obtaining a sequence of pages representing the document; b) defining a set of page construct features associated with each page of the sequence of pages, each page construct feature defined as a document element which recurrently occurs at regular positions outside a running content of the sequence of pages, the construct feature defined by a feature value types; c) computing a set of feature values associated with the set of page construct features for each page of the sequence; d) generating a set of n-grams from the sequence of pages, an n-gram including an ordered sequence of n page construct features provided by a sequence of n pages; e) electing sequential n-grams from the set of n-grams, the sequential n-grams defined as similar contiguous n-grams; f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page construct hierarchical sequential structure associated with the document.

DETAILED DESCRIPTION

This disclosure provides an application of a grammar inference method adapted for document processing as provided in U.S. patent application Ser. No. 13/911,452, by Hervé Déjean, filed Jun. 6, 2013, and entitled "METHODS AND SYSTEMS FOR GENERATION OF DOCUMENT STRUCTURES BASED ON SEQUENTIAL CONSTRAINTS", to the problem of detecting page constructs, i.e. layout elements on the pages of a document whose presence is only due to the paginated formatting of the document. For purposes of this disclosure, page constructs include headers, footers, page numbers, etc. Previous methods of determining page constructs is essentially based on repeated text, where the method and system provided herein instead, exploits repetitive patterns in the positions of page elements and a basic prior knowledge about the location of page constructs. Notably, the disclosed method and system is relatively robust and applies well to OCRed input.

The method and system provided herein detects textual and graphical page constructs associated with a document. For purposes of this disclosure, a page construct is defined as a document element which recurrently occurs on regular position in pages, outside of the running content stream, typically, a page header or page footer. The disclosed method and system is based on the detection of sequential regularities in a set of pages. Initially, potential elements are selected and then a sequence-based method is used to detect regularities whereby regular page construct zones are identified and associated to pages. Finally, the page construct zones are tagged, as well as construct elements.

The method and system disclosed herein incorporates a sequential constraint process disclosed in copending and commonly assigned U.S. patent application Ser. No. 13/911, 452, by Hervé Déjean, filed Jun. 6, 2013, and entitled "METHODS AND SYSTEMS FOR GENERATION OF DOCUMENT STRUCTURES BASED ON SEQUENTIAL CONSTRAINTS", which describes a method and system to determine sequential regularities in a sequence of elements. This algorithm is applied herein to identify page constructs: elements not part of the running text of the document which are typically page headers and footers.

According to an exemplary embodiment, the method and system described herein is performed for each of four margins associated with the pages of a document, i.e., top margin, bottom margin, left margin and right margin. The method includes the following steps.

Input: a document is considered a set of pages, a page containing a set of textual (lines) and graphical elements.

A) Block segmentation. Running and standing blocks as defined hereinafter, are recognized.

B) Page elements which are potentially page constructs associated with the document are selected based on heuristic (s) applied to the recognized standing blocks.

C) A sequence-based method is applied to detect page construct zones.

D) Based on the output of step c, page construct zones objects are created for pages.

Definitions of Page Construct(s), Page Construct Zones, Running and Standing Elements, as used herein, are provided below.

For purposes of the disclosed page construct generation method and system, a page is organized into two primary parts: the content area and the margins, where margins can include textual or graphical elements. A basic example is a page header and a footer. U.S. Pat. No. 7,937,653, by Déjean et al., issued May 3, 2011, and entitled "METHOD AND APPARATUS FOR DETECTING PAGINATION CONSTRUCTS INCLUDING A HEADER AND A FOOTER IN LEGACY DOCUMENTS" refers to page header and footer elements as page constructs and defines page constructs as elements of a document resulting from page segmentation.

A page construct zone is defined as a zone which includes one or more page constructs. According to an exemplary embodiment, four zones are defined for a page, one for each margin: top, bottom, left and right portions of the page. The exemplary method and system described herein is applied to the top construct of a page. However, it is to be understood the described method/system can be extended to the three other zones similarly. Notably, the method and system can be applied simultaneously to the different page constructs, however, this was determined not to be advantageous for purposes of code simplicity. Separately processing the different zones can provide relatively simple code by providing similar/common code for each of the top, bottom, left and right page constructs.

Page constructs, according to previous methods, are normally associated with a combination of the following characteristics:

Page constructs characteristically include frequent textual elements; and

Page constructs characteristically occur at a fixed position in a page.

In comparison, the first characteristic, frequent textual elements, is not a characteristic identified by the disclosed method and system herein used here, providing an approach orthogonal to others. Instead of using a content-based criterion, the method and system disclosed herein uses a geometric object, i.e. a specific zone.

The second characteristic, a fixed position, is a characteristic identified by the disclosed method and system at the zone level, defined as the fixed margin zone.

A primary criterion used by the exemplary method and system described herein is associated with standing element (s). A standing element associated with a page is built negatively by defining one or more running elements associated with the page. Informally, a running element corresponds to a long piece of text such as a paragraph, and a standing element corresponds to a short piece of text, such as a title. Formally, a running element is defined as a block of at least n lines, each line including at least m words, for example n=3 and m=4. A standing element is then defined as an element which is not running, where the term running is a typographical term associated with the notion of the flow of text. Both parameters, n lines and m words, may be configurable during set up.

To determine standing and running blocks, the textual content of a page is segmented into blocks, i.e. a set of lines. Blocks may be acquired from an OCR output or generated by another process, for example, using a method and system as disclosed in U.S. Patent Publication NO. 2013/0321867, published Dec. 5, 2013, by Hervé Déjean, and entitled "TYPOGRAPHICAL BLOCK GENERATION".

Graphical elements may be provided by OCR engines, or extracted from digital documents using another process, such as a PDF file. The graphical elements are represented by a corresponding bounding box. According to the exemplary page construct generation method and system, any graphical element identified is considered a standing element.

Figure 1:
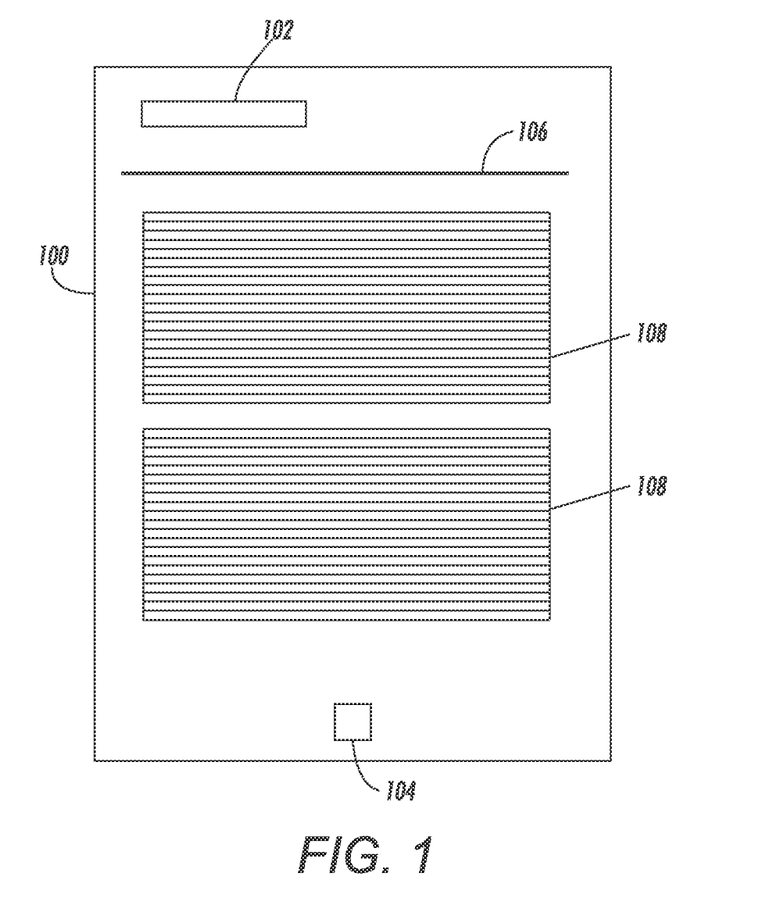
FIG. 1 is a schematical view of a scanned page of a document according to an exemplary embodiment of this disclosure.

With reference to FIG. 1, illustrated are examples of exemplary standing blocks 102 and 104, a graphical element 106 and running blocks, associated with a page 100.

Figure 2:
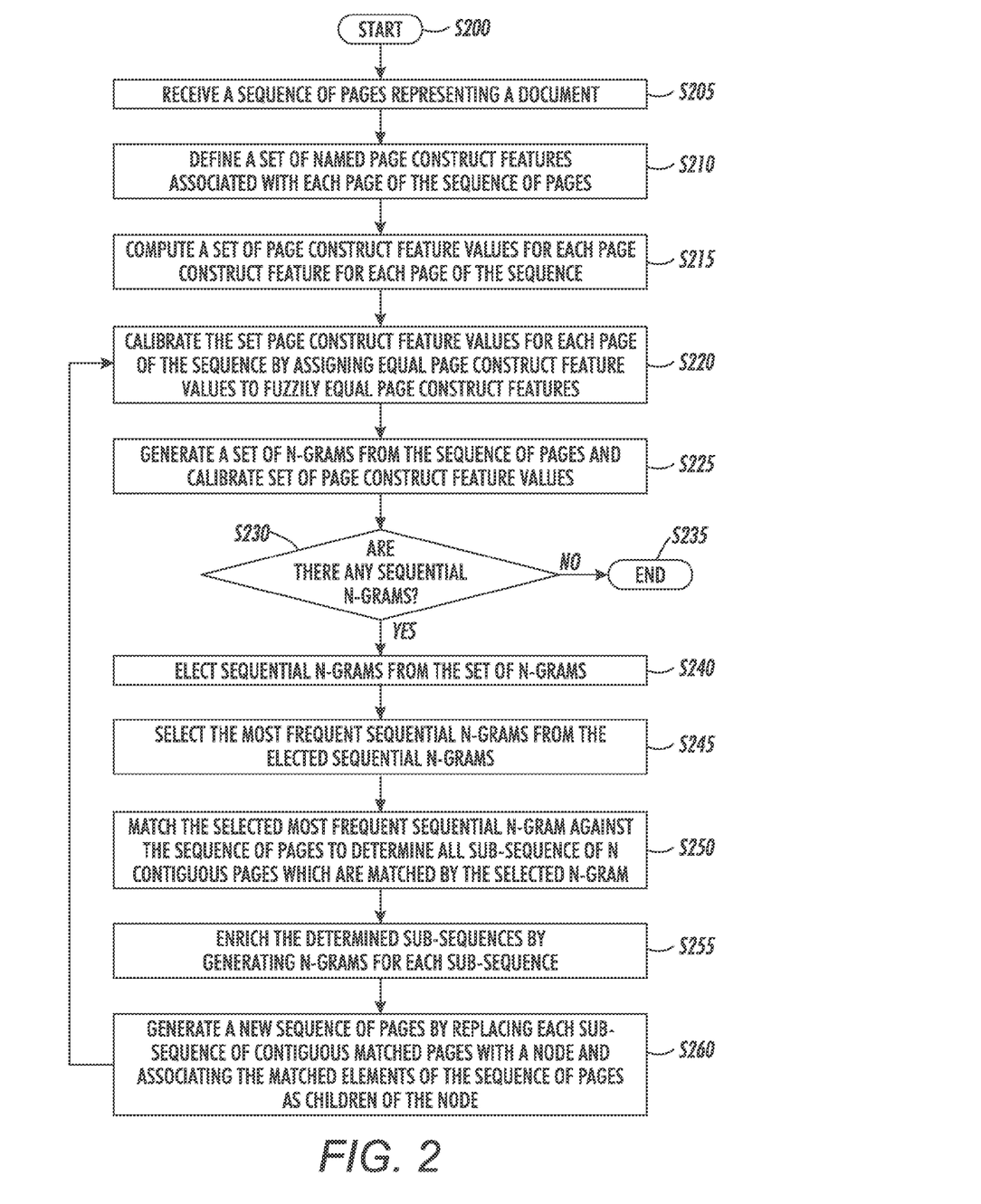
FIG. 2 is a flow chart of method of generating a page construct sequential hierarchical structure associated with a document according to an exemplary embodiment of this disclosure.

FIG. 2 is a flow chart of method of generating a page construct sequential hierarchical structure associated with a document according to an exemplary embodiment of this disclosure.

At step S200, the process starts.

Then, at step S205, the process receives a sequence of pages representing a document.

Next, at step S210, the process defines a set of named page construct features associated with each page of the sequence of pages.

Next, at step S215, the process computes a set of page construct feature values for each page construct feature for each page of the sequence.

Next, at step S220, the process calibrates the set of page construct feature values for each page of the sequence by assigning equal feature values to fuzzily equal page construct features.

Next, at step S225, the process generates a set of n-grams from the sequence of pages and calibrates a set of page construct feature values.

Next, at step S230, the process determines if there are any sequential n-grams. If there are sequential n-grams, the process continues to step S240, otherwise, the process ends at step S235.

At step S240, the process elects sequential n-grams from the set of n-grams.

Next, at step S245, the process selects the most frequent sequential n-gram from the elected sequential n-grams.

Next, at step S250, the process matches the selected most frequent sequential n-gram against the sequence of pages to determine all sub-sequences of n contiguous pages which are matched by the selected n-gram.

Next, at step S255, the process enriches the determined sub-sequences by generating n-grams for each sub-sequence.

Next, at step S260, the process generates a new sequence of pages by replacing each sub-sequence of contiguous matched pages with a node and associating the matched pages of the sequence of pages as children of the node and returns to step S220.

Figure 3:
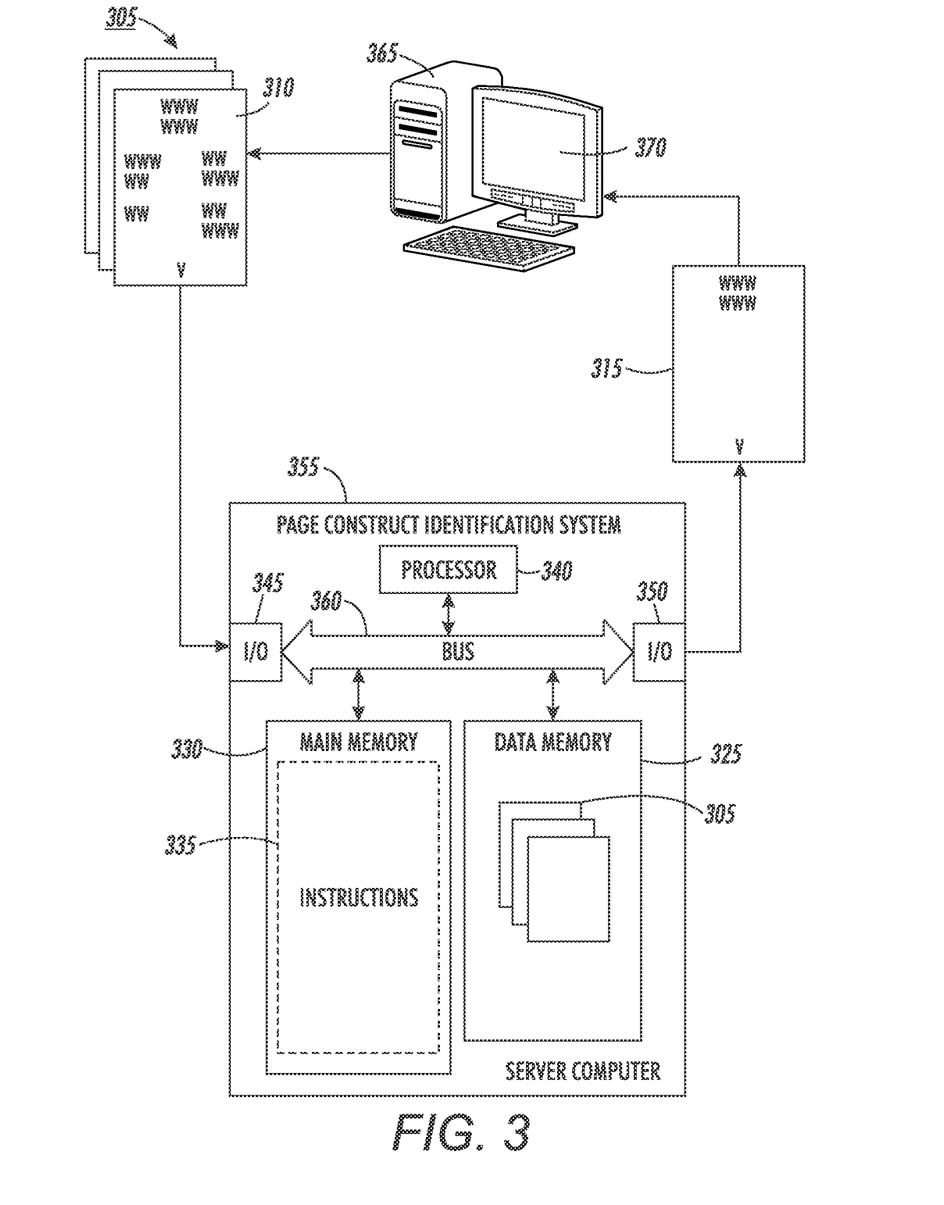
FIG. 3 is a functional block diagram of a document processing system which generates a page construct sequential hierarchical structure associated with a document according to an exemplary embodiment of this disclosure.

With reference to FIG. 3, illustrated is an exemplary system for generating a page construct sequential hierarchical structure associated with a document which may be used for performing the methods previously described and further described hereinafter. The system takes as input a document 305 which includes one or more document pages 310. The system outputs information 315 describing the page construct sequential hierarchical structure(s) which have been identified on the page.

The exemplary system may include one or more specific or general purpose computing devices 320. The system receives, as input, a document 310 and stores the document in data memory 325 during processing. The document is received in electronic form and can be a technical manual, book, journal publication, report, plan, or the like. The exemplary document is in a page description language, such as a PDF, Portable Document Format (ADOBE® SYSTEMS) file, although other unstructured documents are also contemplated, such as PostScript (ADOBE® SYSTEMS), PCL, Printer Command Language (HEWLETT-PACKARD®), such as PCL-5, PCL-5E, PCL-6, PCL-XL, TIFF, BMP, Word document, or the like. In PDF, for example, each page of a document is assigned a set of elements, such as text elements and graphical elements, and their respective sizes and locations are identified in a job ticket. The exemplary document includes one or more pages, each of which may be processed independently by the system. The page(s) may each include text, images, or combinations thereof. Images can be photographs, graphics, etc.

Main memory 330 of the apparatus 355 stores instructions 335 for performing the exemplary method. These instructions 335 are implemented by an associated processor 340, such as the computer's CPU. The computer communicates with external devices via one or more input/output devices 345, 650. The hardware components 325, 330, 340, 345, 350 are communicatively linked by a data/control bus 360.

While a collection of documents could be processed, rather than a single document, the exemplary method is also suited to processing documents singly. Prior to inputting, the document pages may be stored in any suitable tangible storage media such as a disk, ROM or RAM, or may be input into the system in the form of a carrier wave, e.g., via the Internet. The input device may include a modem link, a wired or wireless connection, USB port, floppy or hard disk receiver, or the like and may be separated or combined with other components of the system. While the illustrated source of the document is a client computing device 365, which may be similarly configured to computer 355, except as noted, it will be appreciated that the document may be input from a scanner, or other digital image capture device, with an associated Optical Character Recognition (OCR) engine for processing the output of the scanner to generate the pages of document, or from a disk, flash drive or other memory storage device.

The system may comprise one or more computing devices such as a personal computer, PDA, laptop computer, server computer, or combination thereof. Memories 325, 330 may be integral or separate and may represent any type of non-transitory computer readable medium such as random access memory (RAM), read only memory (ROM), magnetic disk or tape, optical disk, flash memory, or holographic memory. In one embodiment, the memories comprise a combination of random access memory and read only memory. In some embodiments, the processor and memory may be combined in a single chip.

The digital processor 340 can be variously embodied, such as by a single core processor, a dual core processor (or more generally by a multiple core processor), a digital processor and cooperating math coprocessor, a digital controller, or the like. The digital processor, in addition to controlling the operation of the computer, executes instructions stored in memory for performing the method outlined in FIG. 2, and others discussed herein.

The system may output the information, specifically, document image information, to an external computing device, such as device, or to another output device, such as a display device, such as a screen, or a hardcopy output device, such as a printer, or the like, or to a remote memory storage device. The source/output device may be connected directly with the system or linked thereto, e.g., via a wired or wireless link, such as a local area network or wide area network, such as the Internet. In some embodiments, the information output of the system is stored in memory for further processing, in which content of the document page is labeled or otherwise processed, using the identified page construct structures as input information. The system may generate a graphical user interface (GUI) for display to a user. The exemplary GUI may enable a user to interact with the system via a display screen with a user input device, such as a cursor control device, keyboard, keypad, joystick, touchscreen, or the like. In one exemplary embodiment the display screen 370 is linked to the client computing device 365 and client device includes a web browser which allows the user to interact with the apparatus.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so called "firmware" that is software stored on a ROM or so forth. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The illustrated instructions for performing the method may be in the form of hardware or a combination of hardware and software. As will be appreciated, the system may include fewer or more components while still having the same functionality. For example, components may be combined to form fewer components, or may be functionally separated to form more individual components. These components are best understood with reference to the exemplary described method, which, in part, is described with reference to FIGS. 2 and 3.

Various aspects of the method and system will now be described in greater detail.

Sequence-Based Method

Described now is a generic sequence-based method, as described in U.S. patent application Ser. No. 13/911,452, by Hervé Déjean, filed Jun. 6, 2013, and entitled "METHODS AND SYSTEMS FOR GENERATION OF DOCUMENT STRUCTURES BASED ON SEQUENTIAL CONSTRAINS". The objective of the method is to structure a sequence of elements by identifying repetitive contiguous patterns called features. The method allows selecting key features values based on structural criteria, instead of simply using frequencies.

In general, the disclosed method and system can be considered as a way to add tree-like structures on top of a sequence of elements, the tree structures being inferred using repetitive characteristics of the elements, where elements in a given structure share a common feature.

The steps of a generic sequence-based method are as follows where an input is an ordered sequence of elements associated with one or more pages of a document:

1) Elements characterization: Elements are described with a set of features.

2) Features are calibrated: similar features are regrouped together providing a kind of clustering.

3) N-grams generation: a set of n-grams from 1 to N, N being a configurable parameter, is generated for the sequence of elements.

4) Repetitive N-grams are selected and ordered by frequency.

5) The most frequent n-gram is selected and sequences of elements matching this n-gram are structured by regrouping under a common node.

6) The identified sequences are enriched with additional n-grams.

7) The method is applied iteratively to the current sequence of elements.

The following description provides additional details of the application of the sequence-based method described above to generate a page construct sequential hierarchical structure according to the exemplary embodiment described herein.

Page Construct Zones Generation

Elements characterization. Starting from the top of a page, all standing elements are collected moving from the top of the page towards the bottom of the page, as long as no running elements are detected. Graphical elements or images are processed as standing elements. For each standing element, one feature is created where the feature defines a zone which corresponds to the bottom boundary of the zone, i.e. TOP margin. A numerical feature corresponding to the bottom horizontal line, i.e., y coordinate, of the zone is created, referred hereafter as boundary line.

Figure 4:
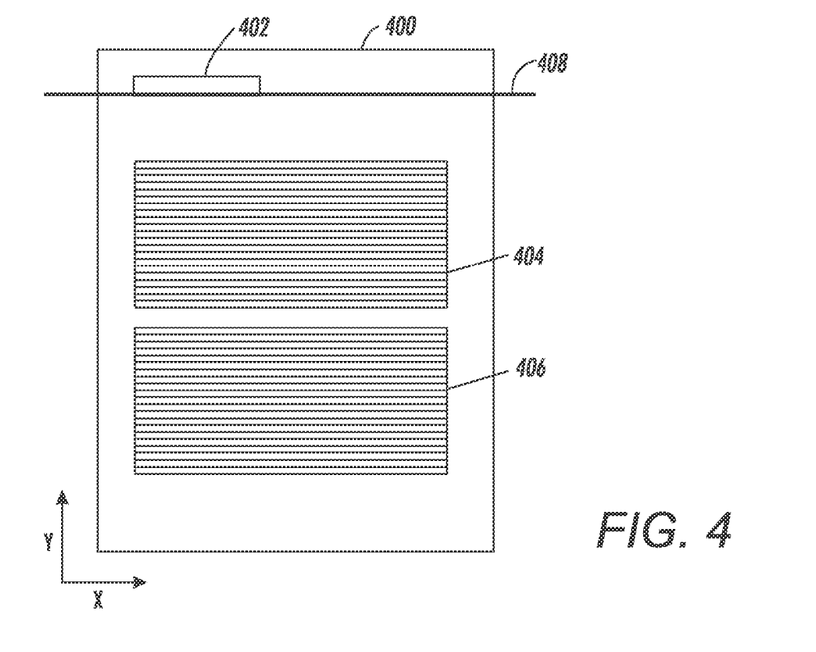
FIGS. 4 and 5 are schematical views of a scanned page of a document illustrating two boundary line computations according to an exemplary embodiment of this disclosure.

FIG. 4 is a schematical view of an example of a scanned page of a document 400 including a standing element 402, running elements 404 and 406, and a boundary line 408 which corresponds to a bottom boundary of a top zone.

Figure 5:
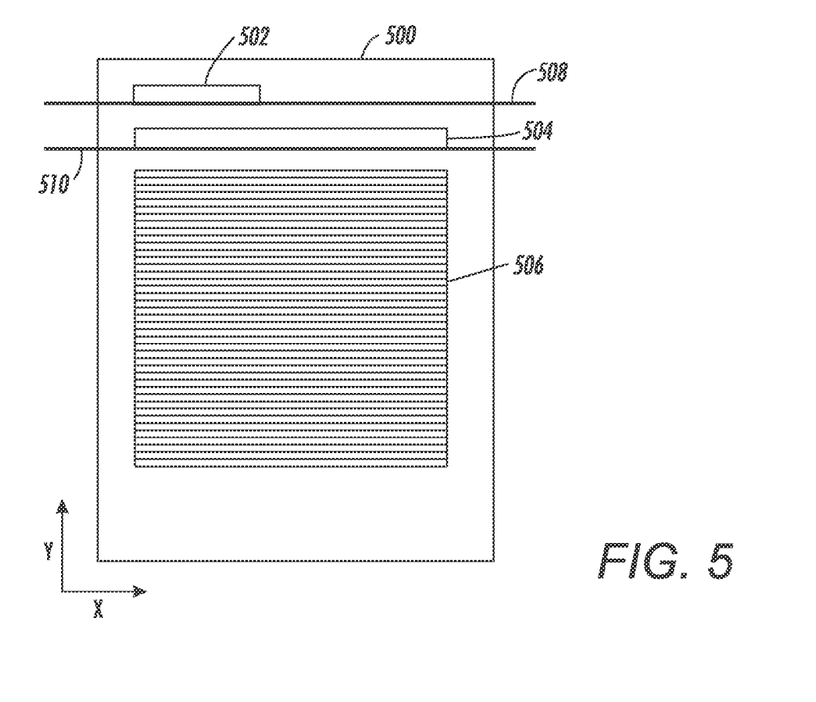

FIG. 5 is a schematical view of another example of a scanned page of a document 500 including standing elements 502 and 504, running element 506, and a boundary line 508 which corresponds to a bottom boundary of a top zone. In addition to boundary line 508, an orphan boundary line 510 is generated.

Feature Calibration using a threshold value=5 points, boundary lines with similar values, less than 5 points, are clustered together for scanned pages of the document.

N-grams generation. Only unigrams and bigrams are generated for the exemplary embodiment described herein.

Repetitive n-grams selection. Repetitive n-grams are identified and sorted and then the most frequent repetitive n-gram is selected.

Sequencing of elements. Sequences of element matching the most frequent repetitive n-gram selected are structured by regrouping under a common node. In order to accommodate segmentation error, i.e. wrong blocks, the matching function may be twofold:

1. if the page has standing blocks, a normal feature comparison is done.

2. If the page does not match the feature, a standing block is created per line, and then a feature comparison is performed. In other words, if a page has no standing block, the page is considered as matching the feature if one of its lines matches this feature.

Enrichment. Enrichment is performed to potentially add several features to an element.

Iteration. Iteratively performing steps 2)-6) enables the detection of structures with different page layouts, such as a first page of chapter, and corresponding mirrored pages.

If no sequence is found, the method stops here indicating page construct for the zone is found. Pages covered by the final sequence are assigned a boundary line corresponding to their lower boundary line, which provides enough information to define a page construct zone. For the page top zones case, all elements above the line are considered as page construct elements.

Figure 6:
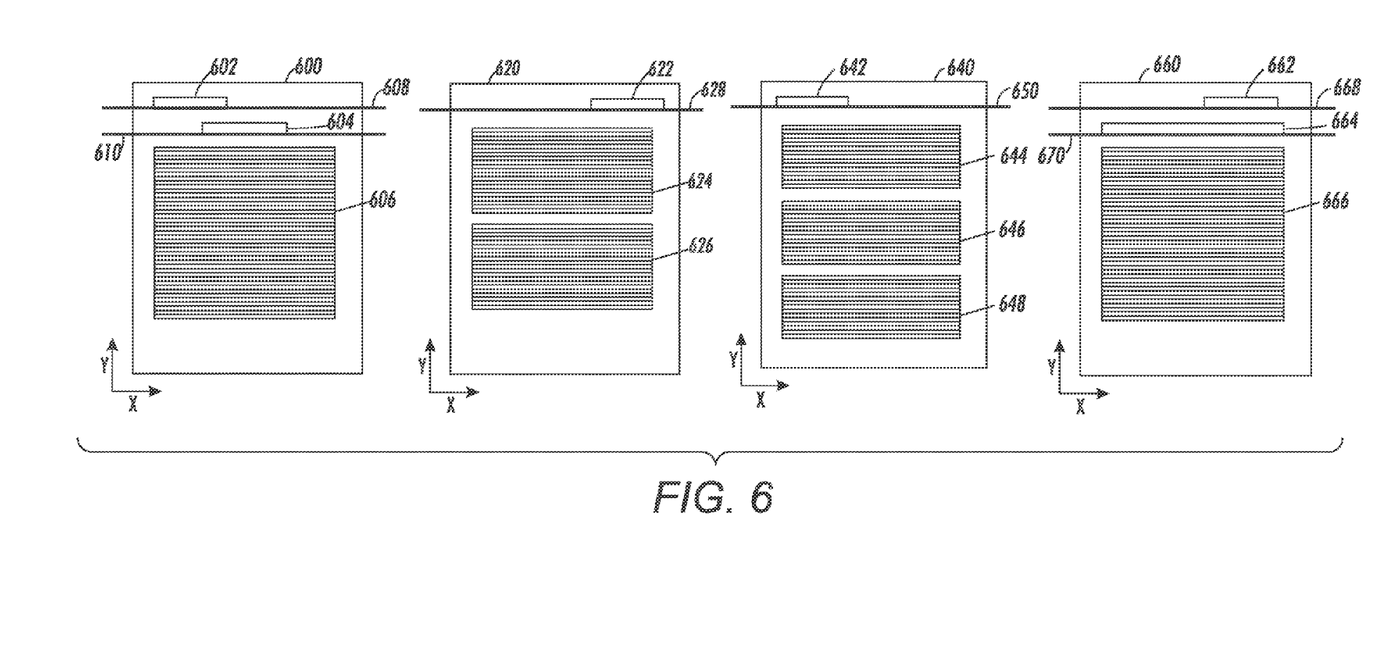
FIG. 6 is a sequence of four document pages segmented to identify standing blocks and running blocks associated with a top zone according to an exemplary embodiment of this disclosure.

With reference to FIG. 6, illustrated is an example sequence of four pages 600, 620, 640 and 660 associated with a document.

Input: The sequence is composed of four pages. Block segmentation is performed in order to identify standing and running blocks. Page 600 includes standing elements 622 and running elements 624 and 626. Page 640 includes standing element 642 and running elements 644, 646 and 648. Page 660 includes standing element 662 and 664, and running element 666.

[STEP 1]: The generated features for the four pages are shown below in Table 1, where BL indicates Boundary Line feature: As shown in FIG. 6, BL=20 corresponds to boundary lines 608, 628, 650 and 668, respectively, for pages 1-4, BL=50 corresponds to orphan boundary line 610, and BL=60 corresponds to orphan boundary line 670.

TABLE 1

| Page | Features |
| --- | --- |
| 1 | BL = 20; BL = 50 |
| 2 | BL = 20 |
| 3 | BL = 20 |
| 4 | BL = 20; BL = 60 |

[STEP 2]: Calibration not required.

[STEP 3]: The generated n-grams are shown below in Table 2.

TABLE 2

| Size | |
| --- | --- |
| uni-grams | [BL = 20]; [BL = 50]; [BL = 60] |
| bigrams | [BL = 20; BL = 20], [BL = 20; BL = 60], [BL = 50; BL = 20] |

[STEP 4]: Only the unigram [BL=20] is sequential, i.e. followed by a common n-gram. Therefore, n-gram [BL=20] is selected.

Figure 7:
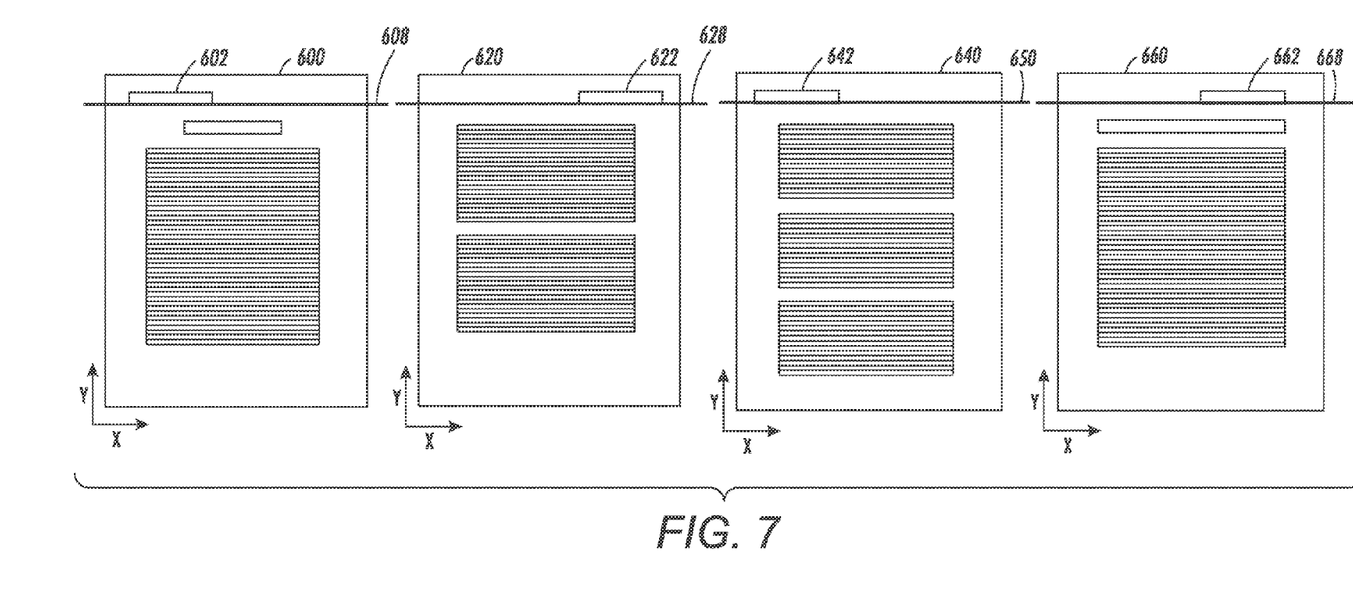
FIG. 7 is the resulting sequence of four document pages illustrated in FIG. 5 after the pages have been processed according to an exemplary embodiment of this disclosure.
Figure 8:
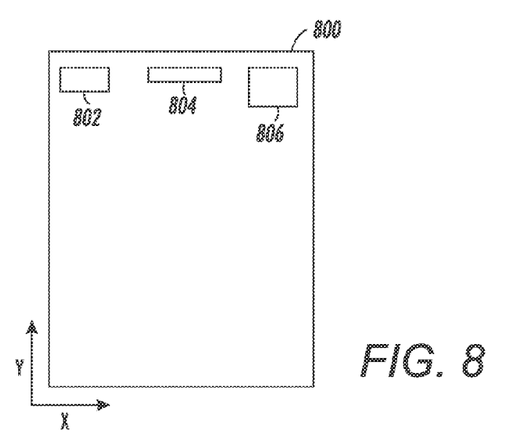
FIGS. 8, 9 and 10 illustrate three types of page headers detected according to an exemplary embodiment of this disclosure.
Figure 9:
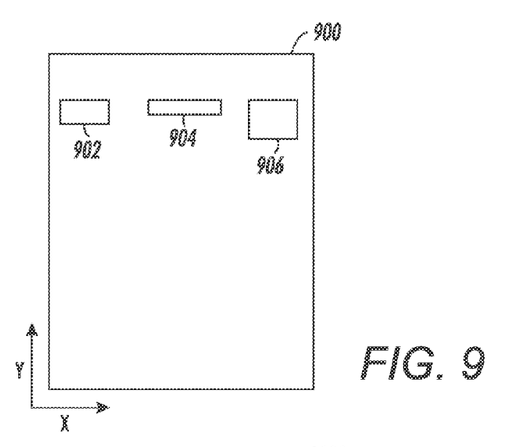
Figure 10:
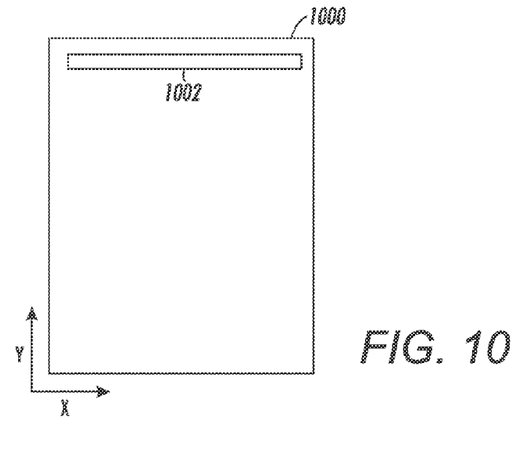

[STEP 5]: The n-gram [BL=20] is matched against the pages and the resulting sequence is structured as shown in Table 3 below. As shown in FIG. 7, the resulting structure does not include orphan boundary lines 604 and 670.

TABLE 3

| TopNode | | Terminal |
|---|---|---|
| [BL = 20]+ | | |
| | [BL = 20] | 1 |
| | [BL = 20] | 2 |
| | [BL = 20] | 3 |
| | [BL = 20] | 4 |

[STEP 6]: No possible enrichment.

[STEP 7]: Iteration: the process stops here, the four pages being covered.

The final step is to tag each page and page elements according to the features associated to each page: Using the boundary line value, i.e. feature value associated to each page, the top margin zone is tagged. Elements inside this zone are considered as part of the page construct.

Steps 1-7 as described above are applied to the three remaining margins, i.e. bottom, left, and right.

Example

Illustrated here is the method and system applied to a multiple page example document. The document has several page header zones, due to some irregularities as a result of multiple authors and due to the presence of one short appendix. The page construct type considered here is the top page construct, i.e., header.

Figure 11:
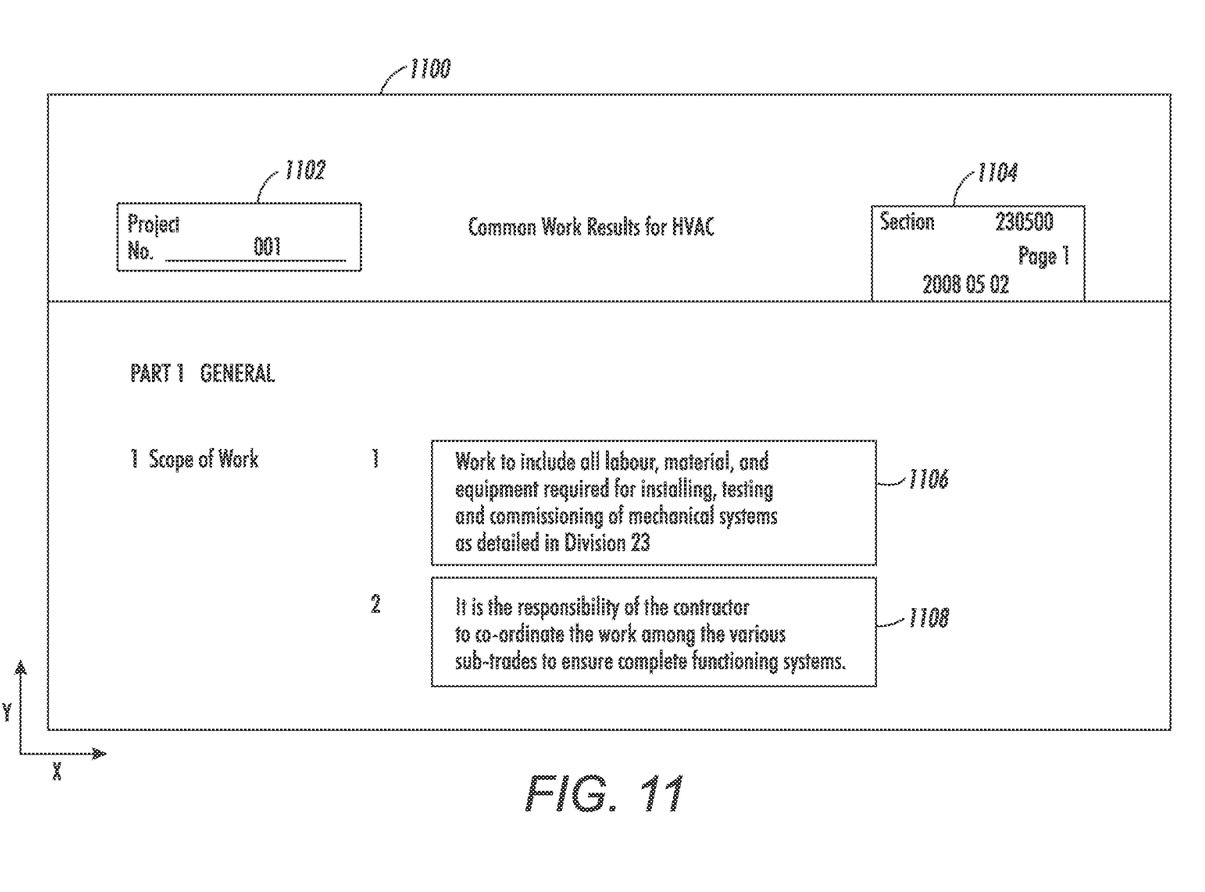
FIG. 11 shows an example of a frequent page header structure.

With reference to FIG. 11, exemplary method and system described herein identified page header zone 1110 indicated. As shown in page 1100 the method identified standing elements 1102 and 1104, and running elements 1106 and 1108.

One key difference with other methods is the use of standing elements, i.e., short elements. The disclosed page construct method and system accommodates documents with OCR noise because the repetitiveness of the text is not required, as well as documents with very short sections for which a page construct corresponds to a section title.

Similarly to the other methods, the most difficult case concerns very short documents, for example one to three pages. The detected sequences are short and less reliable. However, such a situation can be foreseen where the total number of document pages is known.

The disclosed method and system relies on horizontal-positioning information specifying locations of page elements within a page. In order to compute this type of information. The method and system may use absolute elements positioning within a page for digital-born documents, or apply a page frame detection method as disclosed in U.S. Patent Application Publication No. 2012/0079370, by Hervé Déjean, published Mar. 29, 2012 and entitled "SYSTEM AND METHOD FOR PAGE FRAME DETECTION" and/or U.S. patent application Ser. No. 13/943,263 by Hervé Déjean, filed Jul. 16, 2013, and entitled "PAGE FRAME AND PAGE COORDINATE DETERMINATION METHOD AND SYSTEM BASED ON SEQUENTIAL REGULARITIES" for scanned documents, especially for scanned books, using the relative position of the page elements within the page frame.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of generating a page construct sequential hierarchical structure associated with a sequence of pages associated with a digital version of a document comprising:
    a) obtaining a sequence of pages representing the document;
    b) defining a set of page construct features associated with each page of the sequence of pages, each page construct feature defined as a document element which recurrently occurs at regular positions outside a running content of the sequence of pages, the construct feature defined by a feature value types;
    c) computing a set of feature values associated with the set of page construct features for each page of the sequence;
    d) generating a set of n-grams from the sequence of pages, an n-gram including an ordered sequence of n page construct features provided by a sequence of n pages;
    e) electing sequential n-grams from the set of n-grams;
    f) selecting the most frequent sequential n-gram from the elected sequential n-grams;
    g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page construct hierarchical sequential structure associated with the document,
    wherein step d) further comprises:
    d1) calibrating the set of page construct feature values for each page of the sequence by assigning equal feature values to page construct features which are fuzzily equal, wherein fuzzily equal page construct feature values are associated with feature values which are within a predetermined range of value differences; and
    d2) generating a set of n-grams from the sequence of page constructs and calibrated set of page construct feature values, an n-gram including an ordered sequence of n page construct features provided by a sequence of n pages;
    wherein step g) further comprises:
    g1) matching the selected most frequent sequential n-gram against the sequence of pages to determine all sub-sequences of n contiguous pages which are matched by the selected n-gram;
    g2) enriching the determined sub-sequences by generating n-grams for each sub-sequence; and
    g3) generating a new sequence of pages by replacing each sub-sequence of contiguous matched elements with a respective node and associating the matched pages of the sequence of pages as children of the respective node; and
    h) iteratively repeating steps d)-g) on the new sequence of pages generated in step g) until all sequential n-grams associated with the sequence of pages are matched against the sequence of pages associated with the document, the respective matched pages of the sequence of pages are replaced with a respective node, and the respective matched pages of the sequence of pages are associated as children of the respective node.

2. The computer implemented method according to claim 1, wherein steps d)-g) are iteratively repeated for the new sequence of the pages as long as step f) can select a most frequent sequential n-gram from the elected sequential n-grams.

3. The computer implemented method according to claim 1, wherein a most frequent feature value is considered a canonical feature value for the page construct features which are fuzzily equal.

4. The computer implemented method according to claim 1, wherein the page construct features include a position of one or more of a left margin, a right margin, a top margin, a bottom margin, a header and a footer.

5. The computer implemented method according to claim 1, further comprising:
    generating a page construct object associated with each page, the page construct fields representing one or more of position, width, left margin, right margin, height, top margin and bottom margin.

6. The computer implemented method according to claim 1, further comprising:
    associating with each page of the document a coordinate system.

7. The computer method according to claim 1, further comprising:
    generating a page construct object associated with each page, the page construct fields representing one or more of position, width, left margin, right margin, height, top margin and bottom margin; and
    associating with each page of the document a coordinate system.

8. An image processing system comprising:
    a controller including an operatively associated memory configured to store instructions and an operatively associated processor configured to execute the instructions, the controller configured to receive a digital version of a document, and perform a method of generating a page construct hierarchical sequential structure associated with a digital version of the document comprising:
    a) obtaining a sequence of pages representing the document;
    b) defining a set of page construct features associated with each page of the sequence of pages, each page construct feature defined as a document element which recurrently occurs at regular positions outside a running content of the sequence of pages, the construct feature defined by a feature value types;

c) computing a set of feature values associated with the set of page construct features for each page of the sequence;

d) generating a set of n-grams from the sequence of pages, an n-gram including an ordered sequence of n page construct features provided by a sequence of n pages;

e) electing sequential n-grams from the set of n-grams;

f) selecting the most frequent sequential n-gram from the elected sequential n-grams;

g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page construct hierarchical sequential structure associated with the document, wherein step d) further comprises:

d1) calibrating the set of page construct feature values for each page of the sequence by assigning equal feature values to page construct features which are fuzzily equal, wherein fuzzily equal page construct feature values are associated with feature values which are within a predetermined range of value differences; and d2) generating a set of n-grams from the sequence of pages and calibrated set of page construct feature values, an n-gram including an ordered sequence of n page construct features provided by a sequence of n pages;

wherein step g) further comprises:

g1) matching the selected most frequent sequential n-gram against the sequence of pages to determine all sub-sequences of n contiguous pages which are matched by the selected n-gram;

g2) enriching the determined sub-sequences by generating n-grams for each sub-sequence; and g3) generating a new sequence of pages by replacing each sub-sequence of contiguous matched pages with a respective node and associating the matched pages of the sequence of pages as children of the respective node; and h) iteratively repeating steps d)-g) on the new sequence of pages generated in step g) until all sequential n-grams associated with the sequence of pages are matched against the sequence of pages associated with the document, the respective matched pages of the sequence of pages replaced with a respective node and the respective matched pages of the sequence of pages associated as children of the respective node.

9. The image processing system according to claim 8, wherein the page construct features include a position of one or more of a left margin, a right margin, a top margin, a bottom margin, a header and a footer.

10. The image processing system according to claim 8, further comprising:

generating a page construct object associated with each page, the page construct fields representing one or more of position, width, left margin, right margin, height, top margin and bottom margin.

11. The image processing system according to claim 8, further comprising:

associating with each page of the document a coordinate system.

12. The image processing system of claim 8, further comprising:

generating a page construct object associated with each page, the page construct fields representing one or more of position, width, left margin, right margin, height, top margin and bottom margin; and associating with each page of the document a coordinate system.

13. A computer program product comprising a non-transitory recording medium storing instructions, which when executed on a computer cause the computer to perform a method of generating a page construct hierarchical sequential structure associated with a digital version of a document comprising:

a) obtaining a sequence of pages representing the document;

b) defining a set of page construct features associated with each page of the sequence of pages, each page construct feature defined as a document element which recurrently occurs at regular positions outside a running content of the sequence of pages, the construct feature defined by a feature value types;

c) computing a set of feature values associated with the set of page construct features for each page of the sequence;

d) generating a set of n-grams from the sequence of pages, an n-gram including an ordered sequence of n page construct features provided by a sequence of n pages;

e) electing sequential n-grams from the set of n-grams;

f) selecting the most frequent sequential n-gram from the elected sequential n-grams;

g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page construct hierarchical sequential structure associated with the document, wherein step d) further comprises:

d1) calibrating the set of page construct feature values for each page of the sequence by assigning equal feature values to page construct features which are fuzzily equal, wherein fuzzily equal page construct feature values are associated with feature values which are within a predetermined range of value differences; and d2) generating a set of n-grams from the sequence of page constructs and calibrated set of page construct feature values, an n-gram including an ordered sequence of n page construct features provided by a sequence of n pages;

wherein step g) further comprises:

g1) matching the selected most frequent sequential n-gram against the sequence of pages to determine all sub-sequences of n contiguous pages which are matched by the selected n-gram;

g2) enriching the determined sub-sequences by generating n-grams for each sub-sequence; and g3) generating a new sequence of pages by replacing each sub-sequence of contiguous matched elements with a respective node and associating the matched pages of the sequence of pages as children of the respective node; and h) iteratively repeating steps d)-g) on the new sequence of pages generated in step g) until all sequential n-grams associated with the sequence of pages are matched against the sequence of pages associated with the document, the respective matched pages of the sequence of pages are replaced with a respective node, and the respective matched pages of the sequence of pages are associated as children of the respective node.

14. The computer program product according to claim 13, wherein the page construct features include a position of one or more of a left margin, a right margin, a top margin and a bottom margin.

\* \* \* \* \*